United States Patent
Singh et al.

(10) Patent No.: US 9,781,645 B2
(45) Date of Patent: Oct. 3, 2017

(54) SELF-ADJUSTING MOBILE PLATFORM POLICY ENFORCEMENT AGENT FOR CONTROLLING NETWORK ACCESS, MOBILITY AND EFFICIENT USE OF LOCAL AND NETWORK RESOURCES

(71) Applicant: Smith Micro Software, Inc., Aliso Viejo, CA (US)

(72) Inventors: Bikramjit Singh, Carlsbad, CA (US); Dzung Tran, Purcellville, VA (US); Stephen Mkandawire, Aliso Viejo, CA (US); Angelo Rodriguez, Corona, CA (US)

(73) Assignee: Smith Micro Software, Inc., Aliso Viejo, CA (US)

( * ) Notice: Subject to any disclaimer, the term of this patent is extended or adjusted under 35 U.S.C. 154(b) by 59 days.

(21) Appl. No.: 14/853,685

(22) Filed: Sep. 14, 2015

(65) Prior Publication Data
US 2016/0007258 A1 Jan. 7, 2016

Related U.S. Application Data

(63) Continuation of application No. 13/626,627, filed on Sep. 25, 2012, now Pat. No. 9,173,144.

(60) Provisional application No. 61/540,373, filed on Sep. 28, 2011.

(51) Int. Cl.
*H04W 36/00* (2009.01)
*H04W 36/14* (2009.01)
(Continued)

(52) U.S. Cl.
CPC ............ *H04W 36/14* (2013.01); *H04L 43/08* (2013.01); *H04W 36/18* (2013.01); *H04W 36/22* (2013.01);
(Continued)

(58) Field of Classification Search
CPC ..... H04W 36/18; H04W 36/24; H04W 36/00; H04W 36/30; H04W 36/14; H04L 43/08
(Continued)

(56) References Cited

U.S. PATENT DOCUMENTS

| | | | | |
|---|---|---|---|---|
| 7,693,107 B2 * | 4/2010 | De Froment | ..... | H04W 36/0016 370/331 |
| 8,050,232 B2 * | 11/2011 | Sachs | ..... | H04W 36/02 370/331 |

(Continued)

FOREIGN PATENT DOCUMENTS

| CN | 101022450 A | 8/2007 |
|---|---|---|
| WO | WO 2010/080966 A1 | 7/2010 |

*Primary Examiner* — William Nealon
(74) *Attorney, Agent, or Firm* — Farjami & Farjami LLP (57) ABSTRACT

Presented is a method for controlling network access for the mobile device. The method includes analyzing a first plurality of network parameters, collected by the mobile device, based on one or more local network policies. The method further includes receiving an update for the one or more local network policies from a policy server based on a second plurality of network parameters received by the policy server from a plurality of mobile devices. The method also includes rerouting data traffic for the mobile device from a first wireless network configuration to a second wireless network configuration based on the analyzing of the second plurality of network parameters and the update from the policy server. Rerouting data traffic for the mobile device may include maintaining a constant IP address utilizing a virtual network adapter within the mobile device to provide split tunneling over two or more network connections of the second wireless network configuration.

8 Claims, 7 Drawing Sheets

(51) Int. Cl.
*H04L 12/26* (2006.01)
*H04W 36/18* (2009.01)
*H04W 36/32* (2009.01)
*H04W 36/22* (2009.01)
*H04W 76/06* (2009.01)
*H04W 36/24* (2009.01)
*H04W 84/12* (2009.01)

(52) U.S. Cl.
CPC .......... *H04W 36/32* (2013.01); *H04W 76/06* (2013.01); *H04W 36/24* (2013.01); *H04W 84/12* (2013.01)

(58) Field of Classification Search
USPC .............................. 455/437, 432.1; 370/332
See application file for complete search history.

(56) References Cited

U.S. PATENT DOCUMENTS

| | | | |
|---|---|---|---|
| 2002/0085719 A1* | 7/2002 | Crosbie | H04W 36/0011 380/248 |
| 2003/0185172 A1* | 10/2003 | Rue | H04L 29/12028 370/331 |
| 2004/0193712 A1* | 9/2004 | Benenati | H04L 63/0815 709/225 |
| 2006/0256750 A1* | 11/2006 | Van Bemmel | H04W 36/18 370/331 |
| 2007/0104145 A1 | 5/2007 | Jan | |
| 2007/0218888 A1* | 9/2007 | De Froment | H04W 36/0016 455/422.1 |
| 2008/0159232 A1 | 7/2008 | Thalanany | |
| 2010/0169475 A1 | 7/2010 | Woundy | |

\* cited by examiner

SELF-ADJUSTING MOBILE PLATFORM POLICY ENFORCEMENT AGENT FOR CONTROLLING NETWORK ACCESS, MOBILITY AND EFFICIENT USE OF LOCAL AND NETWORK RESOURCES

RELATED APPLICATIONS

This application is a Continuation of U.S. patent application Ser. No. 13/626,627, filed on Sep. 25, 2012, which claims priority of U.S. Provisional Application No. 61/540,373 filed on Sep. 28, 2011, which are hereby incorporated by reference in its entirety.

BACKGROUND

As the capabilities of mobile devices continue to increase, wireless carrier networks supporting the mobile devices are being pushed to their capacity. Because traffic over any given wireless network is heavily dependent on variables including but not limited to the time of day and location within the network, periodic under-utilization and bottlenecking at different locations and times within specific networks is common. In addition, conventional networks do not allow for seamless transitions from one type of network to another. For example, in a conventional wireless network, switching from 3G to WiFi typically causes a new IP address to be assigned within the mobile device corresponding to the new wireless connection, causing termination or disruption of the original communication session. Such termination can cause disruption of the users' experience. In addition, suboptimal and uncoordinated methods of controlling the types of networks over which data is communicated based on individual users' settings and preferences do not adequately take into account network impacts and requirements on a macroscopic, network-wide scale.

SUMMARY OF THE INVENTION

The present disclosure is directed to a self-adjusting mobile platform policy enforcement agent for controlling network access, mobility and efficient use of local and network resources, substantially as shown in and/or described in connection with at least one of the figures, and as set forth more completely in the claims.

DETAILED DESCRIPTION

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Current mobile device technologies are capable of supporting multiple wireless access technologies such as 2G, 3G, WiFi and WiMax/LTE. As the volume of data being transferred wirelessly increases, mobile device users may want to access resources via any type of network available at a particular time and location. However, uncoordinated connectivity methods based on single mobile device user settings and preferences may cause network resource under-utilization or pressure points. Because open platforms allow network applications to run unfettered once installed by the user, multiple applications frequently generate unwanted traffic. Because this traffic is broadcast over cellular networks, such as 2G/3G/4G networks for example, provision of associated resources over non-2G/3G/4G networks is not easily attained. Consequently, current mobile device technologies do not offer the means to efficiently manage network resources made accessible through other technologies, such as WiFi, for example. Therefore, as traffic requirements of wireless networks continue to increase, service providers struggle to maintain a seamless user experience to access carrier network resources and services on non-2G/3G/4G networks.

Current access technologies allow network-based policy management and enforcement of policies based on IP packet analysis in the network. However, in such network-based policy management schemes traffic must traverse the wireless network into the network core or to the network-side access gateway before deep packet inspection (DPI) is performed, unnecessarily wasting wireless bandwidth over the network. Moreover, current network analysis may suffer from "blind spots" due to the impact of unavailable or under-performing networks on the IP traffic patterns being analyzed. Current access technologies may separately allow client-based policy management according to user actions/settings. However, such management is affected without regard for network pressures or resources.

The present application presents an end-to-end solution for wireless service providers to extend self-adjusting policy from a network core to all serviced mobile devices, enabling a higher quality user experience while optimizing network resource utilization over a variety of wireless access technologies. Additionally, seamless mobility and security for traffic between client applications and the services being delivered makes adjustments in network access completely transparent to the end user. Such self-adjusting policy may be derived from network parameters such as, but not limited to, the time of day, a current traffic load or bandwidth on a particular network link or network, a received signal strength indication (RSSI), the number of mobile devices on a particular network link, a particular quality of service (QoS) standard, a cost of service, a location or velocity of a particular mobile device, a type of connected or available network, a particular subscriber plan, or an application identification (ID).

The present application allows data that is constantly changing, whether on the network or the client or both, to be taken into account when renewing policy and enforcement rules. For example, utilizing statistical analysis of real-time as well as previously collected network parameters reported by a collection of mobile devices on the network may provide a real-time macro-level understanding of the state of an entire network and facilitate the creation of predictive patterns for network access, management and utilization by the mobile devices.

Grouping of network connection policies for mobile devices on the network may be based on any number of criteria. Non-limiting examples of such policy grouping criteria may include a mobile device make or model, a particular geographical location, a particular subscriber plan or entitlement, custom created groups of subscribers, or any combination of subscriber information, consumption patterns, service type, application type or network type. In this way multiple network connection policies may be developed for different groupings of mobile devices within a particular network. Because multiple network connection policies may be developed, multiple goals may be achieved accordingly. Non-limiting examples of such goals may include a network provider or a mobile device user choosing to optimize a particular aspect of the user experience, a minimum quality of service, a cost of service for a particular mobile device user, or a speed of data transmission over the network. The goal or goals for which network connection policies are focused may be changed at any time.

Figure 1:
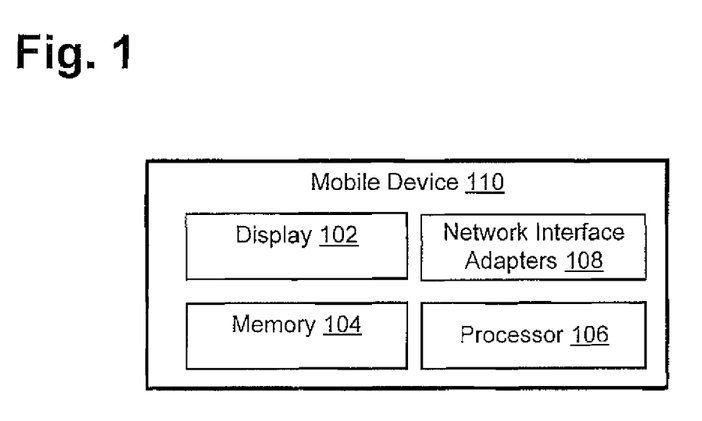
FIG. 1 presents an exemplary mobile device configured to self-adjust network access, according to one implementation of the present application.

FIG. 1 presents an exemplary mobile device configured to self-adjust network access, according to one implementation of the present application. For example, mobile device 110 may include display 102, memory 104, processor 106, and communication interfaces 108. Display 102 may be configured to display any information on mobile device 110, as required by one or more implementations of the present application. Memory 104 may be configured to store a self-adjusting mobile platform policy enforcement agent application for controlling network connections of mobile device 110, as well as store any other information that may be utilized by mobile device 110. Processor 106 may be configured to carry out any required calculations, procedures or processes for controlling network access for mobile device 110, as set forth by one or more implementations of the present application. Finally, network interface adapters 108 may be configured to provide an interface between the self-adjusting mobile platform policy enforcement agent application and wireless connections to and from mobile device 110.

Figure 2:
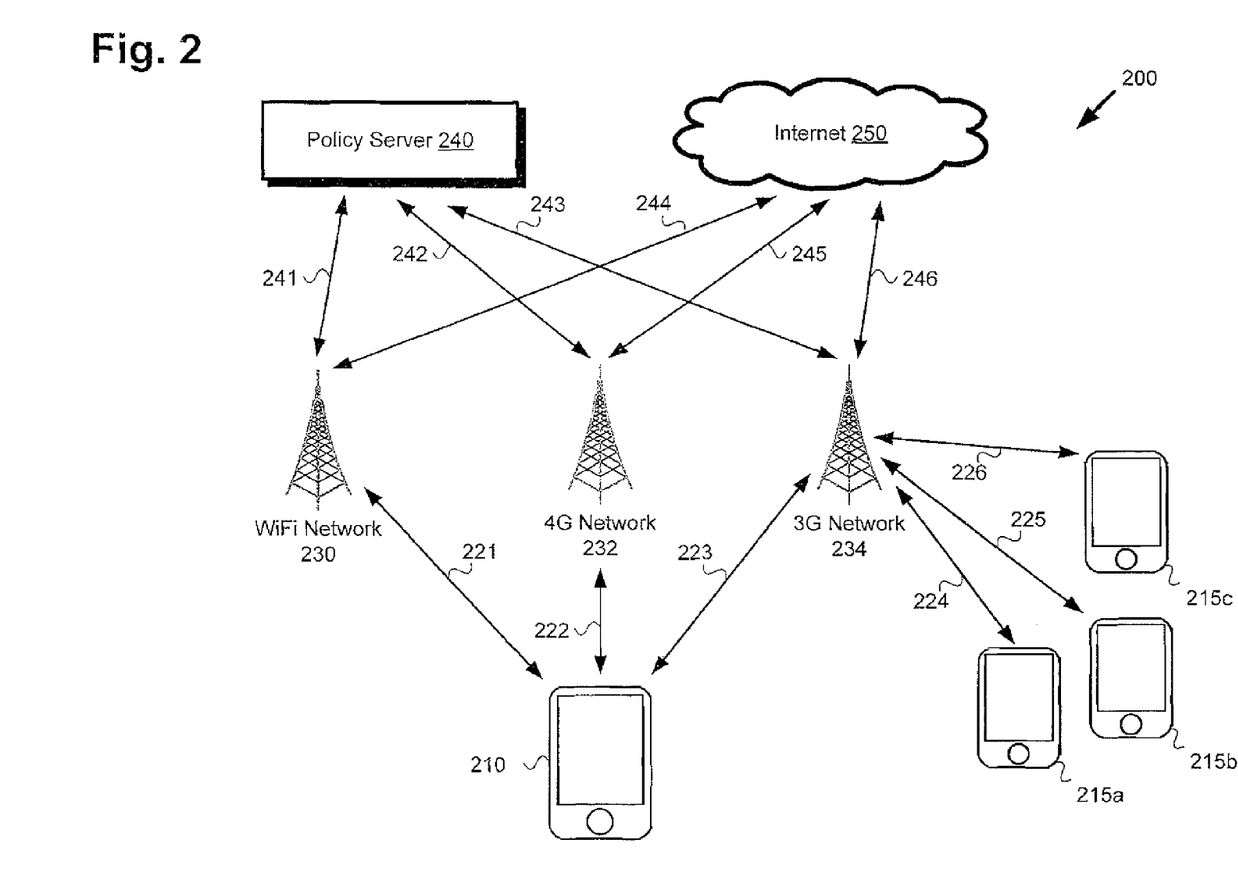
FIG. 2 presents an exemplary system for controlling network access for a mobile device, according to one implementation of the present application.

FIG. 2 presents an exemplary system for controlling network access for a mobile device, according to one implementation of the present application. As shown in FIG. 2, system 200 may include mobile device 210 as well as several other mobile devices 215a-215c. System 200 may further include several wireless network links, such as WiFi network link 230, 4G network link 232, and 3G network link 224, over which each of the mobile devices may connect for sending or receiving desired content. Network links 230, 232 and 234 are not limited to the network link types discussed above. Rather, each may be one of a WiFi link, a WiMax link, a 2G, 3G or 4G link, or any other wireless network link without limitation. In addition, the above network links are not necessarily maintained by the same service provider, but may be maintained by separate service providers.

Mobile device 210 may potentially connect to: WiFi network link 230 via connection 221, 4G network link 232 via connection 222, or 3G network link 234 via connection 223, depending on which link is determined most desirable for a particular network-wide state. Likewise, mobile devices 215a-c may communicate with 3G network link 234 via connections 224-226, respectively. Each of the mobile devices may be communicatively connected to Internet 250 through any of the network links. However, in the present example, Internet 250 is connected to: WiFi network link via connection 244, 4G network link 232 via connection 245, and 3G network link 234 via connection 246.

System 200 may additionally include policy server 240, which may communicate with each mobile device to administrate network-wide, policy-driven control and management of network access and mobility. Policy server 240 may connect to: WiFi network link 230 via connection 241, 4G network link 232 via connection 222, and 3G network link 234 via connection 223. In cooperation, policy server 240 and each of mobile devices 210 and 215a-c may provide local as well as network-wide, policy-driven control and management of network access and mobility by most efficiently rerouting, reshaping and/or throttling data traffic for a particular mobile device from a first network configuration to a second network configuration.

In operation, system 200 may include a dual feedback loop of network connectivity management and control. A first local feedback loop may correspond to local network connectivity policies based on user preferences or connectivity policy rules for a particular mobile device, such as mobile device 210. A user may directly enter such preferences or connectivity policy rules into mobile device 210, or alternatively, access a web-based interface to create or update such preferences or connectivity policy rules. For example, a user may define a rule that a 3G connection should always be utilized before a WiFi or 4G connection where possible. Here, if mobile device 210 determines that WiFi network link 230, 4G network link 232, and 3G network link 234 are each available, the user-defined local network connectivity policy may select 3G network link 234 as the most desirable network connection.

The second network-wide feedback loop corresponds to network-wide connectivity policies based on real-time and/or previously collected local network parameters received from several mobile devices on the network. For example, policy server 240 may receive a collection of real-time local network parameters from each of mobile devices 215a-c, such as the particular network link on which the mobile device is communicating, the amount of data being communicated, the amount of interference experienced by each mobile device, or any other useful metric pertaining to the particular mobile device. Policy server 240 may receive these local network parameters and evaluate them according to service provider controlled network-wide connectivity policies. Where the network-wide policy maintained by policy server 240 conflicts with that of the local network connectivity policy of any mobile device, the network-wide connectivity policy may override the local connectivity policy of that mobile device for the benefit of the entire network. For example, policy server 240 may determine that 3G network link 234 is very heavily loaded based on the network parameters received from mobile devices 215a-c, and that all devices on the network would experience a higher quality of service if mobile device 210 connected to WiFi network link 230 rather than 3G network link 234, as determined by the first, local feedback loop. Accordingly, policy server 240 may send a network connectivity policy update to mobile device 210 to automatically establish a connection with WiFi network link 230 instead of 3G network link 234. Policy server 240 may additionally send updates to each of mobile devices 215*a-c* notifying each that 3G network link 234 is currently heavily loaded and additional connections may not be made at this time. Alternatively, where a mobile device is having a negative impact on a particular network but has become unreachable for redirection to another available network, several other mobile devices on that network may be redirected to less crowded networks in order to reduce stress on the particular network.

The above described connection process may be viewed as one or more pre-connect policy evaluations. System 200 may additionally be configured to perform one or more post-connection validations against the above-discussed dual policy control. For example, once mobile device 210 establishes the connection to WiFi Network link 230, an evaluation of the quality of the connection with WiFi Network link 230 may be made with respect to the local and network-wide policies to ensure the desired outcome has been achieved. Non-limiting examples of post-connection validations may include speed tests or received signal strength indication (RSSI) tests on one or more network links within the new network configuration. Accordingly, system 200 may provide self-adjusting mobile platform policy enforcement for controlling and managing network access and mobility while maximizing efficient use of local and network resources.

Figure 3:
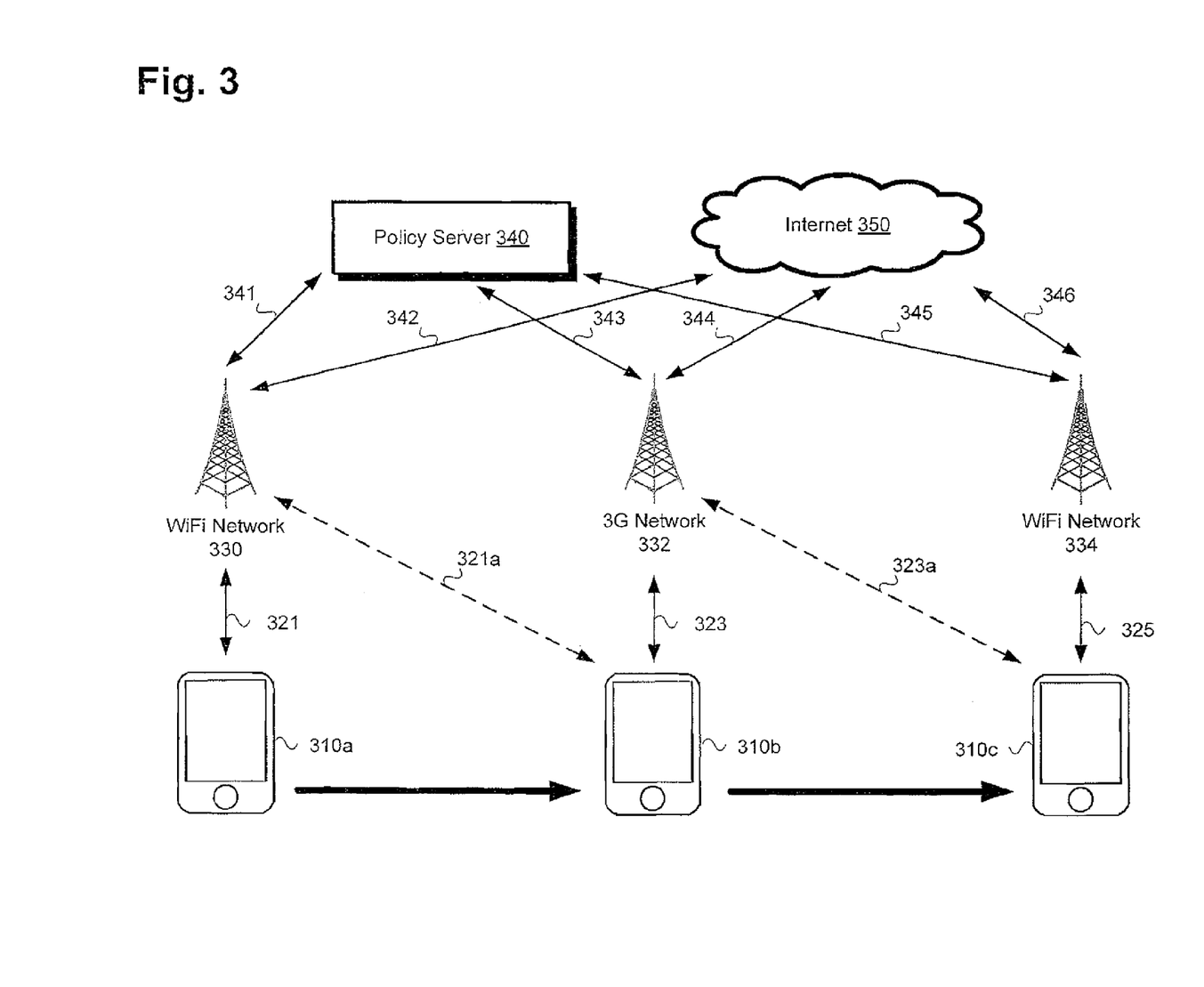
FIG. 3 presents another exemplary system for controlling network access for a mobile device, according to another implementation of the present application.

FIG. 3 presents another exemplary system for controlling network access for a mobile device, according to an implementation of the present application. For example, FIG. 3 may disclose Policy Server 340, Internet 350, WiFi network links 330 and 334, 3G network link 332, and mobile device 310*a-c*. Network links 330, 332 and 334 are not limited to the above-discussed network link types. Rather, each may be one of a WiFi link, a WiMax link, a 2G, 3G or 4G link, or any other wireless link without limitation. Policy Server 340 and Internet 350 may be substantially the same as policy server 240 and Internet 250 of FIG. 2, respectively. And Policy Server 340 and Internet 350 may each communicate with each of the network links via a respective one of connections 341-346. Additionally, mobile device 310*a-c* may represent a single mobile device in motion denoted by the heavy right-pointing arrows. Thus, mobile device 310*b* may be the same device as mobile device 310*a*, however, spatially displaced from the location denoted by mobile device 310*a*. Likewise, mobile device 310*c* may be the same device as mobile device 310*b*, however, spatially displaced from the location denoted by mobile device 310*b*.

In operation, mobile device 310*a* may first be connected to WiFi network link 330, providing access to desired content, such as video from internet 350, as well as access to Policy Server 340, which may monitor and update network policies applied by mobile device 310*a*, substantially as discussed above regarding mobile device 210 and policy server 240 in FIG. 2. As mobile device 310*a* moves to the position denoted by mobile device 310*b*, the connection quality of WiFi network link 330 may decline for any number of reasons. However, 3G network link 332 may now be in range of mobile device 310*b*. Mobile device 310*b* may reference its local network policy rules and determine that a connection to 3G network link 332 is allowed and desirable at this time. This determination may be communicated to Policy Server 340 along with several local network parameters from mobile device 310*b*, where the determination may be validated against network-wide policy based on several network parameters received from one or more other mobile devices in the network (not shown). Connection 321 with WiFi network link 330 may be maintained, as dotted line connection 321*a*, while connection 323 with 3G Network link 332 is automatically configured. Once connection 323 is established, connection 321 may be dropped according to a "make before break" operation. 3G network link 332 now provides connection between mobile device 310*h* and both Policy Server 340 and the content from Internet 350.

As the mobile device continues to the location denoted by mobile device 310*c*, WiFi network link 334 may come into range. Mobile device 310*c* may reference its network policy rules and determine that a connection to WiFi network link 334 is allowed and desirable at this time. Again, this determination may be communicated to Policy Server 340 along with several local network parameters from mobile device 310*c*, where the determination may be validated against network-wide policy. Connection 323 with 3G network link 332 may be maintained, as dotted line connection 323*a*, while connection 325 with WiFi Network link 334 is automatically configured. Once connection 325 is established, connection 323*a* may be dropped in a "make before break" operation. WiFi network link 334 now provides connection between mobile device 310*c* and both Policy Server 340 and the video content, for example, from Internet 350. Thus, as will be described in more detail regarding FIGS. 4-6, a mobile device may transition from one wireless network to another wireless network seamlessly, such that data communication sessions between the mobile device and remote content sources are not interrupted or required to be reset after each transition.

Figure 4:
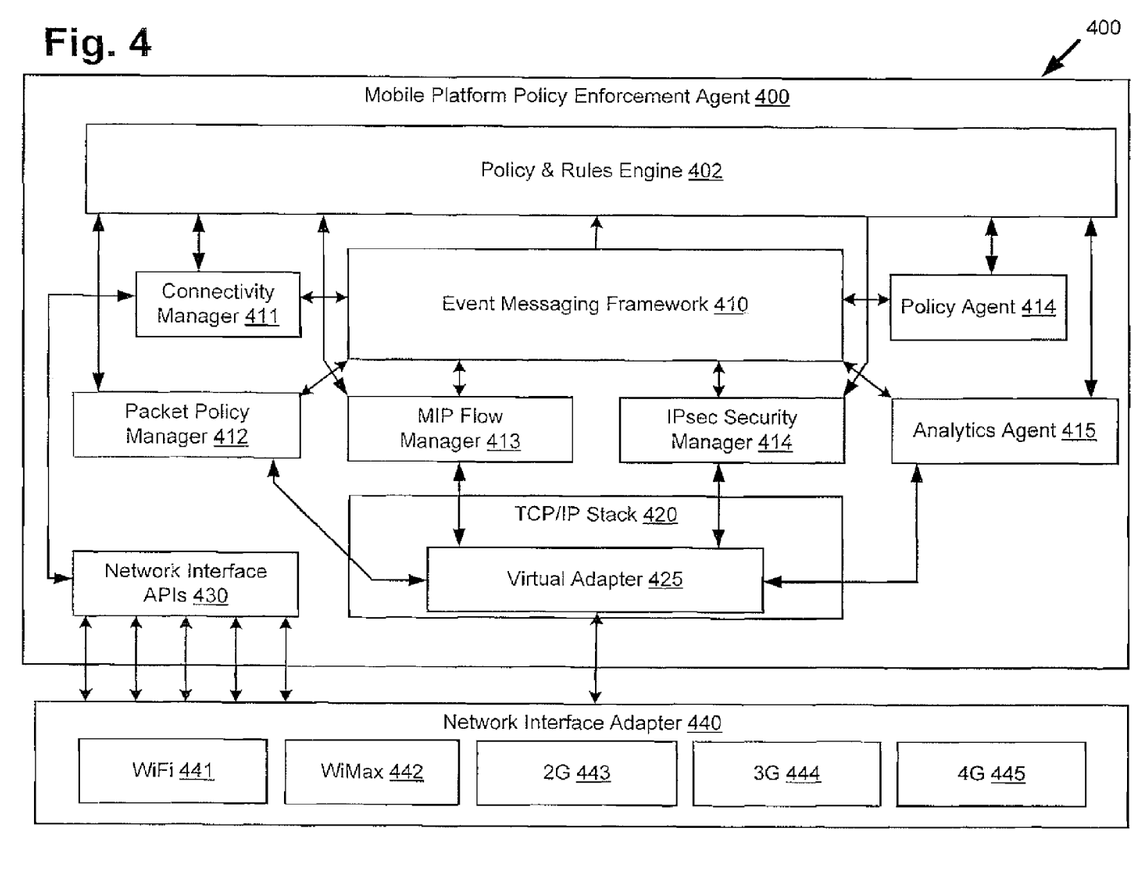
FIG. 4 presents an exemplary diagram of the architecture of a mobile device including a self-adjusting mobile platform policy enforcement agent for controlling network access, according to one implementation of the present application.

FIG. 4 presents an exemplary diagram of the architecture within a mobile device including a self-adjusting mobile platform policy enforcement agent 400 for controlling network access, according to one implementation of the present application. Self-adjusting mobile platform policy enforcement agent 400 may be implemented in software and/or hardware and may allow control over connectivity with one or more wireless network links according to a set of combinatorial rules simultaneously applicable to both a singular mobile device as well as local area networks (LANs) and/or wide area networks (WANs) as a whole, as previously discussed regarding FIGS. 2 and 3. Thus, the present application may ensure a higher quality of service (QoS) for all mobile devices on a wireless network.

Self-adjusting mobile platform policy enforcement agent 400 may include Policy & Rules Engine 402, which may be configured to receive information about the current network environment of the mobile device as well as periodic policy updates from a policy server and make real-time decisions regarding connectivity with one or more available wireless network links.

Event Messaging Framework 410 may be configured to communicate with various modules within self-adjusting mobile platform policy enforcement agent 400, may provide inter-communication between the different modules according to the operations of self-adjusting mobile platform policy enforcement agent 400, and may allow communication of appropriate modules with the network via virtual adapter 425.

Policy & Rules Engine 402 and Event Messaging Framework 410 may each communicate with Mobile Internet Protocol (MIP) Flow Manager 413 and IPsec Security Manager 414. MIP Flow Manager 413 may control and manage multiple streams of IP data from the mobile device to the TCP/IP stack 420, while IPsec Security Manager 414 may control the application of security protocols to data requiring encryption or other security features on a packet-by-packet basis. Moreover, separate concurrent data streams may be communicated to TCP/IP Stack 420 for IP packet assembly of both unsecured and secured data streams simultaneously utilizing dual tunneling. Where dual tunneling of both secured and unsecured data streams is carried out over more than one type of network connection link, one or more secured data streams may be communicated over a first type of network link, while one or more unsecured data streams may be communicated over a second type of network link.

TCP/IP Stack 420 may include Virtual Adapter 425. As will be discussed in further detail regarding FIG. 5, Virtual Adapter 425 may include one or more separate virtual adapters, which may allow for seamless transitions between different network connection types without breaking session by maintaining constant IP addresses for communication sessions across each connected network.

Packet Policy Manager 412 may receive input from Policy & Rules Engine 402 and control how information is grouped into IP packets. Control signals may then be communicated to Virtual Adapter 425 for actual construction and deconstruction of sent and received data packets, respectively.

Connectivity Manager 411 may control which network link or links the mobile device is connected to as directed by Policy & Rules Engine 402. Connectivity Manager 411 may communicate with Network Interface APIs 430 to carry out any transitions from one network link to another at the network interface level. In addition, when a connection is transitioned from one network link or network link type to another, Connectivity Manager 411 may institute a "make before break" connection policy where the network connection being transitioned to is established before breaking connection with the network being transitioned from.

Analytics Agent 415 may collect network parameters for use by self-adjusting mobile platform policy enforcement agent 400 and for transmission to a policy server for periodic updates of network connection policies. Non-limiting examples of network parameters collected may include the time of day, a current traffic load on a particular network link, a received signal strength indication (RSSI), a number of mobile devices on a particular network link, a particular quality of service (QoS) metric, a cost of service, a location or velocity of a particular mobile device, a type of connected or available network, a particular subscriber plan, or an application identification (ID). Analytics Agent 415 may communicate appropriate network parameters to the Policy & Rules Engine 402 for mobile-device-side determination of appropriate network connection policies. Analytics Agent 415 may also transmit appropriate data to a policy server for aggregation of network data over one or more network links from multiple mobile devices via Network Interface Adapter 440. Policy server-side utilization of this appropriate data will be discussed in further detail regarding FIG. 6.

Policy Agent 414 may periodically receive updates to network policies from the policy server. This information may be processed by Policy Agent 414 and communicated to Policy & Rules Engine 402 where the local mobile device rules and policies may be updated to reflect the latest or most appropriate network-wide connectivity policies. Thus, the present inventive concepts allow simultaneous local-level and network-wide-level feedback loops for controlling network connection policies for each mobile device on one or more wireless network links.

Self-adjusting mobile platform policy enforcement agent 400 may further include Network Interface Application Programming Interfaces (APIs) 430, which may include specifications for routines, data structures, object classes, and/or variables necessary for inter-module communication with Network Interface Adapter 440. Network Interface APIs 430 may include one or more APIs to support communication with each of the wireless interfaces of Network Interface Adapter 440.

Network Interface Adapter 440 may be configured to control transmission and reception of wireless or wired signals in a plurality of formats. Thus, Network Interface Adapter 440 may include, for example, WiFi interface 441, a WiMax interface 442, a 2G interface 443, a 3G interface 444, and a 4G interface, for example. However, the present inventive concepts are not limited to the above wireless network interfaces, and Network Interface Adapter 440 may include an interface adapter for controlling any wireless communication format without limitation. Thus, in one implementation, self-adjusting mobile platform policy enforcement agent 400 may directly control each of the communications interfaces such that no data traffic may be transferred to or from the mobile device without the proper network policy in place. The function of virtual adapter 425 will now be discussed in more detail regarding FIG. 5.

IPv4 and the newer IPv6 standard are at the core of standards-based networking methods of the Internet. However, information is packetized differently according to IPv4 compared to IPv6. Thus, for maximal compatibility with current and future trends in IP-based communications, a mobile device according to the present application may include means for seamless construction and deconstruction of both IPv4 and IPv6 packets.

Figure 5:
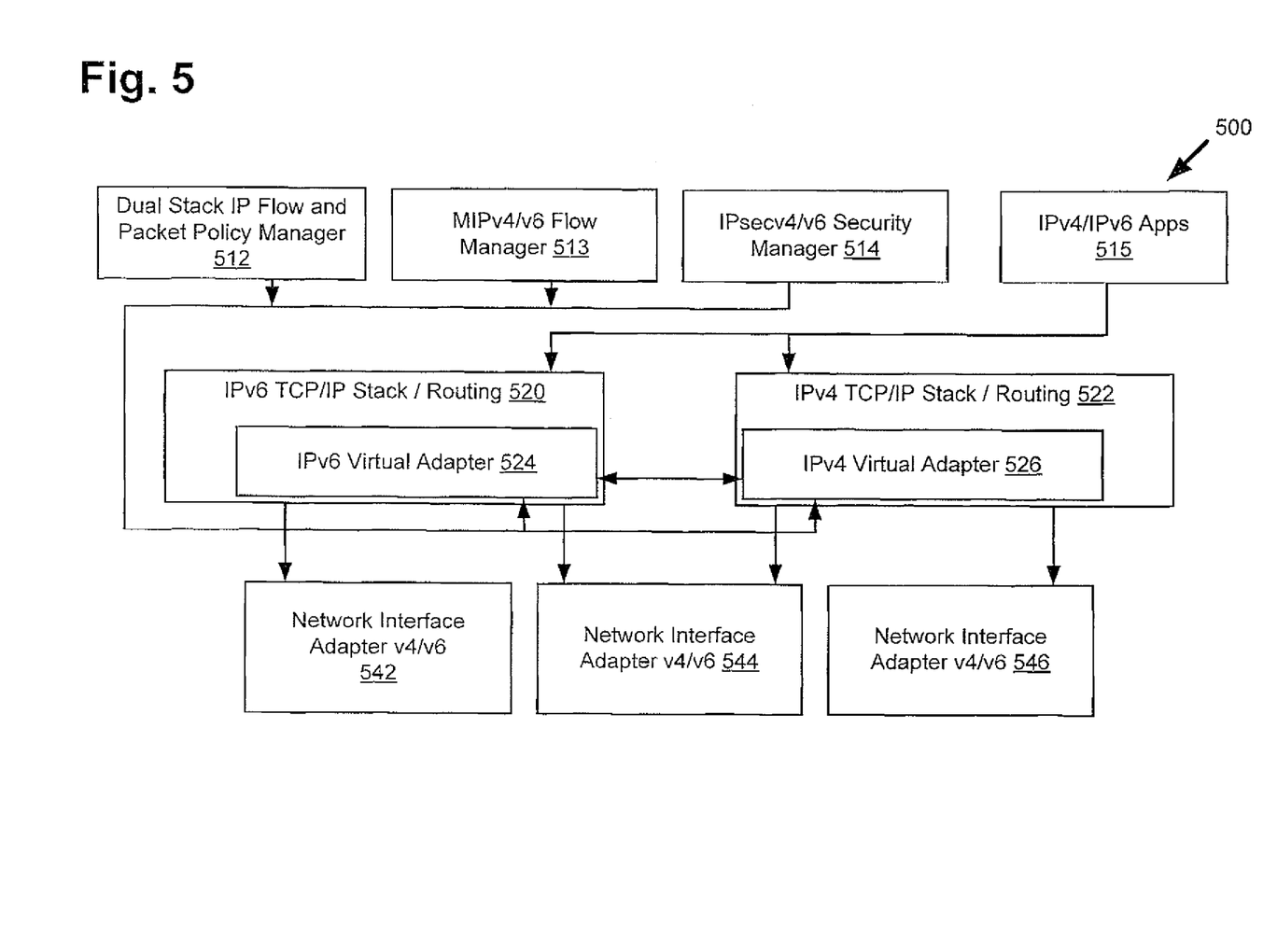
FIG. 5 presents an exemplary diagram of the architecture of a virtual adapter within a mobile device including a self-adjusting mobile platform policy enforcement agent for controlling network access, according to one implementation of the present application.

FIG. 5 presents an exemplary diagram of the architecture of one or more virtual adapters within a mobile device including a self-adjusting mobile platform policy enforcement agent for controlling network access, according to one implementation of the present application.

IPv4/IPv6 Apps 515 may include any applications on the mobile device designed to operate utilizing one or both of the IPv4 and/or IPv6 communication standards. These devices may communicate with an IPv6 TCP/IP Stack 520 and/or an IPv4 TCP/IP Stack 522. IPv6 TCP/IP Stack 520 may include IPv6 Virtual Adapter 524, while IPv4 TCP/IP Stack 522 may include IPv4 Virtual Adapter 526.

FIG. 5 further includes IPv4/IPv6 IPsec Security Manager 514, which may be substantially similar to IPsec Security Manager 414 of FIG. 4, being configured to control the implementation of IPsec security protocols to either IPv4 or IPv6 packetized data requiring encryption or other security features. Mobile IP (MIP) v4/v6 Manager 513 may be substantially similar to MIP flow manager 413 of FIG. 4, being configured to control the flow of traffic to be packetized under IPv4 or IPv6 protocols within IPv4 TCP/IP Stack 522 or IPv6 TCP/IP Stack 520, respectively. Dual Stack IP Flow and Packet Policy Manager 512 may be configured to monitor and control the flow and packetizing of data where a dual stack IP flow is utilized. Each of managers 512-514 may send one or more control signals to each of IPv4 Virtual Adapter 526 and IPv6 Virtual Adapter 524.

IPv4 Virtual Adapter 526 and IPv6 Virtual Adapter 524, within IPv4 TCP/IP Stack 522 and IPv6 TCP/IP Stack 520 respectively, may each communicate with one or more network interface adapters, for example, Network Interface Adapters 542, 544 and 546. Thus, packetized information may be transmitted and received simultaneously through one or more network links via one or more of the network interface adapters.

In operation, IPv4 Virtual Adapter 526 and IPv6 Virtual Adapter 524 manage bindings to real adapters within the mobile device as per packet policy of both the mobile device and a policy server, as previously discussed regarding FIGS. 2-4. For example, packet policy may be in the form of network address translation (NAT) rules, source versus destination identification and routing, application identification and routing, sequencing of tunnel and MIP signaling, flow control and simultaneous bindings, and traffic shaping and throttling. Each virtual adapter maintains a constant local IP address visible to applications on the mobile device, as well as remote content sources based on interoperation with the Mobile IP network infrastructure as a client-based or network-based MIP agent. Thus, IP routing to particular routes through each virtual adapter always remains the same. Accordingly, data communication sessions between the mobile device and one or more remote content sources may transition from one network to another network seamlessly, without breaking the session because the local IP address seen by the applications within the mobile device is maintained by the respective Virtual adapter and is not dependent on the network interface adapter used. However, it is important to note that the remote content source, i.e., content server, sees a single IP address for the mobile device, irrespective of the wireless network to which it is connected, only if the service provider network operating both wireless networks has a Mobile IP support enabled and operational as part of the core network that serves both wireless networks.

Virtual Adapters 524 and 526 accomplish IP flow control and flow switching through the above mentioned policy-based address virtualization. For example, a single MIP IPv4 home address and/or a single MIP IPv6 home address may be maintained on a respective virtual adapter at all times. The mobile device may maintain multiple MIP bindings with an MIP Home Agent serving the mobile device in the network through multiple concurrent IP connections. In the alternative, IPv4 Virtual Adapter 526 and IPv6 Virtual Adapter 524 may be individually dynamically enabled and disabled to regulate data flow by IP address type, thus enabling regulation of specific IP binding types to particular applications.

In addition, IPv4 Virtual Adapter 526 and IPv6 Virtual Adapter 524 may be communicatively coupled to one another to allow real-time traffic conversion and switching between IPv4 and IPv6 protocols. For example, a transmitting application may be designed to operate under IPv4 protocols while a receiving application on the network may be designed to operate under IPv6 protocols. In such a case, the IPv4 application may communicate IPv4 data to IPv4 Virtual Adapter 526. The IPv4 data may be communicated to IPv6 Virtual Adapter 524 and converted to an IPv6 format. The IPv6 Virtual Adapter 524 may then transmit the IPv4-based data, now in an IPv6 format, to the receiving application over the network. In this manner, the present inventive concepts allow for compatibility between mismatched IPv4 and IPv6 applications on the mobile device and within the network.

Figure 6:
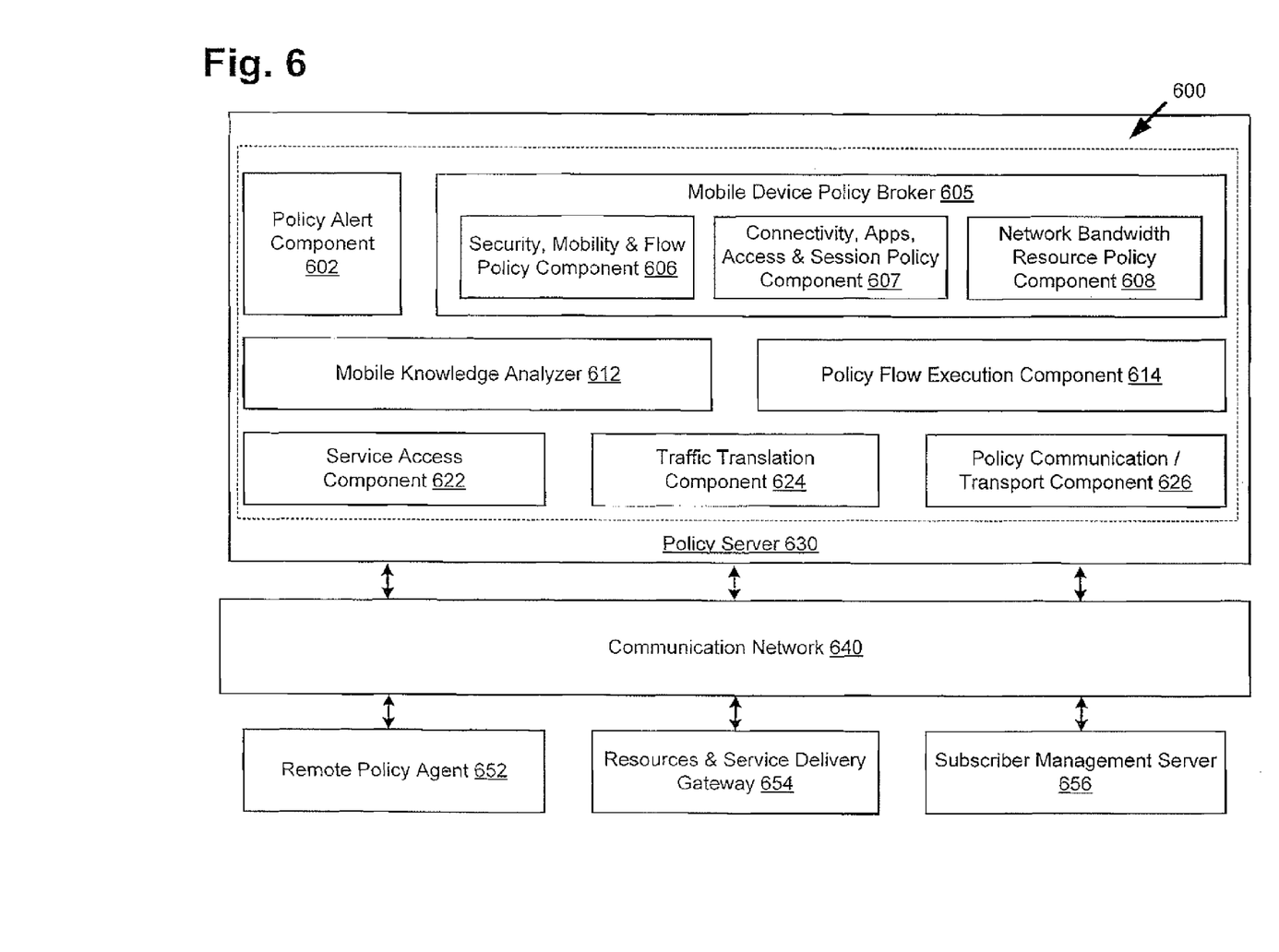
FIG. 6 presents an exemplary diagram of the architecture of a policy server including a server-side mobile platform policy enforcement agent for controlling network access, according to one implementation of the present application.

FIG. 6 presents an exemplary diagram of the architecture of a policy server including a server-side self-adjusting mobile platform policy enforcement agent for controlling network access, according to one implementation of the present application. Policy Server 630 of FIG. 6 includes server-side self-adjusting mobile platform policy enforcement agent 600, which may include Mobile Device Policy Broker 605 having the core engines for driving policy production and maintenance within the network. Mobile Device Policy Broker 605 may include Security, Mobility & Flow Policy Component 606 which may be configured to monitor and control aspects of network communication relating to the security and flow of data across the network according to one or more carrier-controlled, network-based policies. Connectivity, Apps, Access & Session Policy Component 607 may be configured to monitor and control aspects of network communication relating to session parameters and connectivity of mobile devices via one or more network types according to one or more carrier-controlled, network-based policies. Finally, Network Bandwidth Resource Policy Component 608 may be configured to monitor and control aspects of network communication relating to the available bandwidth on one or more network types according to one or more carrier-controlled, network-based policies.

Policy Alert Component 602 may generate one or more alerts as to why a certain policy is affecting service. For example, if the account of a mobile user is unpaid or past due, Policy Alert Component 602 may generate an alert for delivery to the associated mobile device that a particular service is unavailable due to an unpaid account balance, for example. In another example, a particular mobile device may be associated with a particular subscriber plan. If the particular subscriber plan does not include certain premium options, for example, the ability to connect to a 4G network, Policy Alert Component 602 may generate an alert for delivery to the mobile device that 4G service is not available for the mobile device on its current subscriber plan. As will be described in more detail regarding FIG. 7, compatible network subscription upgrades may be offered to the mobile device when one or more alerts are generated by Policy Alert Component 602.

Policy Flow Execution Component 614 may be configured to handle the actual network-side execution of policies regarding the flow of data as maintained and adjusted by the Mobile Device Policy Broker 605. Mobile Knowledge Analyzer 612 may be configured to analyze the parameters received from the mobile devices on the network, for example, from an Analytics Agent 415 of one or more mobile devices, as discussed regarding FIG. 4.

Service Access Component 622 may be configured to monitor and control access to particular services offered by the network provider to particular mobile devices or particular classes of mobile devices in accordance with one or more network-based policies or associated service plans. Traffic Translation Component 624 may be configured to control the translation of data traffic from one format to another as required. For example, Traffic Translation Component 624 may control the translation of IPv4 formatted data packets to an IPv6 format, or vise versa within Policy Server 630. Policy Transport Component 626 may be configured to control the timing and reception of policy-based parameters or local policy decisions from multiple mobile devices serviced by the network, as well as the timing and transmission of policy updates pushed to each of the mobile devices.

Communication with Policy Server 630 may occur over communication network 640, which may include any wireless or wired network link or links with which Policy Server 630 is communicatively coupled. For example, Policy Server 630 may be in communication with a mobile device as previously discussed regarding any of FIGS. 2-6. Remote Policy Agent 652 may correspond to a portion or the entirety of the self-adjusting mobile platform policy enforcement agent within the mobile device. Resources & Services Delivery Gateway 654 may correspond to any server responsible for controlling the delivery of services and/or specific network resources to one or more mobile devices on the network. Finally, Subscriber Management Server 656 may correspond to any server responsible for managing or storing information about the service subscriptions of the mobile device users on the network. Policy Server 630 may be in intermittent or continuous communication with each of Remote Policy Agent 652, Resources & Service Gateway 654, and Subscriber Management Server 656 as required in accordance with one or more implementations described in the present application.

Thus, the implementation disclosed by FIG. 6 may provide a policy server that supports dual, i.e., local and network-wide, feedback loops for controlling network access in a plurality of mobile devices. Accordingly, real-time packet, network and session analysis information may be fed back into each mobile device's network operating behavior. Additionally, aggregated location, network, access volume and analytics-based policy updates may be fed back to alter local network connectivity policies of a group of mobile devices.

Figure 7:
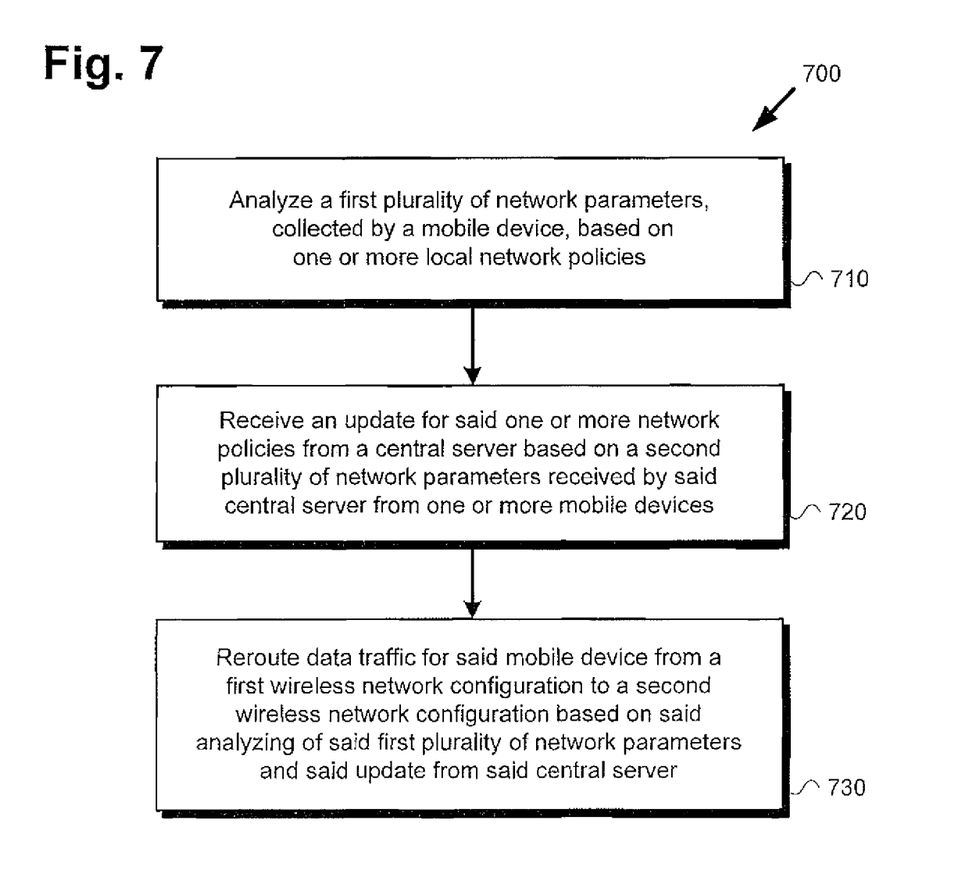
FIG. 7 presents an exemplary flowchart illustrating a method for controlling network access for a mobile device, according to one implementation of the present application.

FIG. 7 presents an exemplary flowchart illustrating a method for controlling network access for a mobile device, according to one implementation of the present application. Action 710 of flowchart 700 includes analyzing a first plurality of network parameters collected by a mobile device based on one or more local network policies. Non-limiting examples of such network parameters may include one or more of the time of day, a current traffic load on a particular network link, a received signal strength indication (RSSI), a number of mobile devices on a particular network link, a particular quality of service (QoS) standard, a cost of service, a location or velocity of a particular mobile device, a type of connected or available network, a particular subscriber plan, or an application identification (ID). These network parameters may include real-time values and/or previously collected values saved within a memory of the mobile device, for example.

Action 720 of flowchart 700 includes receiving an update for the one or more local network policies from a policy server based on a second plurality of network parameters received by the policy server from one or more other devices. For example, as previously discussed regarding FIG. 2, one or more mobile devices may transmit network parameters and/or individual local network policy results to a policy server. Utilizing the real-time and previously collected feedback from multiple mobile devices on the network, the policy server may administrate network-wide, policy-driven control and management of high quality network access for each mobile device on the network. For example, once the policy server has received network parameters from several mobile devices on the network, the policy server may deduce a state or condition of each network link within the network. The policy server may then make adjustments to local network policies from each of the mobile devices based on a particular goal and the current state of the network as a whole, and send an update of those policies to the respective mobile devices.

Action 730 of flowchart 700 includes rerouting data traffic for the mobile device from a first wireless network configuration to a second wireless network configuration based on the analyzing of the first plurality of network parameters and the update from the policy server. Taking into consideration the mobile device's original locally-determined network policy and the update to that policy received from the policy server, one or more wireless network connections not a part of a currently connected wireless network configuration may be selected for configuration of a second wireless network configuration. Both the first and second wireless network configurations may include one or more of a WiFi, a WiMax, a 2G, a 3G, a 4G, an LTE and any other known wireless network connection without limitation.

In one implementation, the mobile device may perform one or more pre-connection tests on the one or more network links that make up the second wireless network configuration. In this manner, the mobile device may ensure connection with the contemplated network links of the second wireless network configuration will adequately support the accomplishment of a particular network goal determined by the service provider of the network, or determined by the aggregation of local policies of the mobile devices on the network or in a particular mobile device group. The mobile device may also perform one or more post-connection tests on the one or more links of the second wireless network configuration to ensure the anticipated conditions from the one or more pre-connection tests exist once actual connection to those one or more links have been established.

In another implementation, action 730 may include one or more of network address translation (NAT), source versus destination identification and routing, application traffic identification and routing, tunnel and MIP sequencing, data flow control and configuration of simultaneous bindings, and traffic shaping and throttling based on the analyzing of the first plurality of network parameters and the update from the policy server.

In yet another implementation, the mobile device may be configured to differentiate between a mobile and a stationary state of the mobile device and, if the mobile device is stationary, further track wireless networks at the most frequented locations for that particular mobile device. Such tracking may include comparing the network resources identified at the stationary location against previously stored network resources and determining if the current stationary location is a frequently visited stationary location. The tracking may be carried out directly by the mobile device, or tracked by a policy server after the presence of such wireless networks in those frequented visited stationary locations have been transmitted to the policy server by the mobile device. Accordingly, pre-saved "home", "work", and/or "play" network links, for example, may be made available to a user of the mobile device based on the frequency of their availability to the mobile device. As a non-limiting example, the mobile device may pre-save a particular network as a "home", "work", and/or "play" network link if it is found available more than 4 times in the past for a particular mobile device. However, any other number of availabilities over any time period is also contemplated.

In such an implementation, the mobile device may first notify a user of the mobile device of the presence of a wireless network configuration which is a "home", "work", and/or "play" network link once it becomes available. The mobile device may then prompt the user to establish the wireless network configuration utilizing the "home", "work", and/or "play" network link. Once the user has established a particular network link as a pre-saved network link, the mobile device may automatically connect to this network link whenever the mobile device comes into range and is determined to be stationary.

In order to be more efficient with utilization of on-board memory of the mobile device, an implementation may enable the mobile device to sense and report its location, and optionally its velocity, to the policy server. Based on the location of the mobile device, and optionally the velocity of the mobile device, a list of available base stations and associated network links within a predetermined radius of the location may be loaded from the policy server to the mobile device. In this manner, determination of appropriate network links for a WiFi offload or wireless network reconfiguration may be faster than when a list of all available base stations at all distances are downloaded to the mobile device.

An implementation may further include offering a user of the mobile device additional network services or network subscription upgrades when one or more network parameters associated with the mobile device exceed, or alternatively fall below, a threshold. For example, when a mobile device has exceeded its limit for an associated data plan on a 2G or 3G network link, the mobile device may automatically perform a WiFi offload to a local WiFi network link, such as a hotel's free WiFi connection. This may be performed seamlessly and without interrupting current communication sessions as described above regarding the virtual adapters of FIG. 5. In the alternative, the mobile device may present a notification on its display that an affiliated WiFi provider subscription is available for a fee. The user may select such a network and the mobile device may automatically perform a WiFi offload as described above, however, to the selected, affiliated WiFi provider. Alternatively, the mobile device may present a notification on its display of available upgrades in the network provider's already-existing subscription package, which would allow the mobile device to resume data downloading. Non-limiting examples may include an increase in a monthly data subscription over the original network link types, or enablement of previously unavailable, faster network link types such as 4G, LTE, or a previously unavailable combination of network link types.

Finally, yet another implementation may allow for radio and battery consumption management in network policy-making decisions. For example, the mobile device may have a local policy that turns off WiFi and/or 4G radios to conserve battery life. If the WiFi and/or 4G connection has not been manually disabled by a user of the mobile device, local policy from the mobile device and/or from policy updates pushed to the mobile device may cause one or more disabled radios on the mobile device to be automatically turned on and the network links serviced by the one or more radios to be utilized in a new, faster or more efficient wireless network configuration.

Thus, the present application provides for controlling network access for a mobile device. A self-adjusting mobile platform policy enforcement agent in mobile devices as well as in a central policy server may allow the extension of self-adjusting network connectivity policy from a network core to each mobile device on the network to enable the best QoS while optimizing the allocation of network resource access. Accordingly, concepts of the present application reduce network congestion in overloaded wireless networks without requiring an increase in absolute network capacity. Additionally, concepts of the present application provide an intelligent, carrier-controlled, policy-driven connectivity solution, which also includes subordinate user-based policy control of network connectivity.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for use by a mobile device having a processor and a memory, the method comprising:
    establishing, using the processor of the mobile device, a first WiFi connection with a first WiFi base station in a first WiFi network;
    performing, using the processor of the mobile device, a data communication over the first WiFi connection;
    collecting, using the processor of the mobile device, a first plurality of WiFi network parameters while using the first WiFi connection, based on one or more local network policies stored in the memory of the mobile device, the first plurality of WiFi network parameters being related to the first WiFi connection with the first WiFi network device in the first WiFi network;
    determining, using the processor of the mobile device, based on one or more local network policies stored in the memory of the mobile device, whether a second WiFi network is available to the mobile device;
    in response to an analysis of the first plurality of WiFi network parameters, establishing, using the processor of the mobile device, a second WiFi connection with a second WiFi base station in the second WiFi network determined to be available to the mobile device;
    switching, using the processor of the mobile device, from the first WiFi connection to the second WiFi connection;
    continuing, using the processor of the mobile device, the data communication over the second WiFi connection;
    collecting, using the processor of the mobile device, a second plurality of WiFi network parameters of the second WiFi network;
    sending, using the processor of the mobile device, the second plurality of WiFi network parameters to a policy server;
    receiving, by the processor of the mobile device, a policy update from the policy server;
    re-establishing, using the processor of the mobile device, the first WiFi connection, in response to receiving the policy update;
    switching, using the processor of the mobile device, from the second WiFi connection to the first WiFi connection; and
    continuing, using the processor of the mobile device, the data communication over the first WiFi connection.

2. The method of claim 1, wherein after switching to the second WiFi connection, the processor is further configured to terminate the first WiFi connection.

3. The method of claim 1, wherein the first WiFi connection and the second WiFi connection use a same IP address.

4. The method of claim 1, wherein prior to establishing the second WiFi connection, the method further comprises:
    terminating the first WiFi connection.

5. A mobile device comprising:
    a memory storing one or more local network policies;
    a processor configured to:
        establish a first WiFi connection with a first WiFi base station in a first WiFi network;

perform a data communication over the first WiFi connection;
collect a first plurality of WiFi network parameters while using the first WiFi connection, based on one or more local network policies stored in the memory of the mobile device, the first plurality of WiFi network parameters being related to the first WiFi connection with the first WiFi network device in the first WiFi network;
determine, based on one or more local network policies stored in the memory of the mobile device, whether a second WiFi network is available to the mobile device;
in response to an analysis of the first plurality of WiFi network parameters, establish a second WiFi connection with a second WiFi base station in the second WiFi network determined to be available to the mobile device;
switch from the first WiFi connection to the second WiFi connection;
continue the data communication over the second WiFi connection;
collect a second plurality of WiFi network parameters of the second WiFi connection;
receive a policy update from the policy server;
establish the first WiFi connection, in response to receiving the policy update;
switch from the second WiFi connection to the first WiFi connection; and
continue the data communication over the first WiFi connection.

6. The mobile device of claim 5, wherein after switching to the second WiFi connection, the processor is further configured to terminate the first WiFi connection.

7. The mobile device of claim 5, wherein the first WiFi connection and the second WiFi connection use a same IP address.

8. The mobile device of claim 5, wherein prior to establishing the second WiFi connection, the processor is further configured to terminate the first WiFi connection.

* * * * *